(12) United States Patent
Nowotny et al.

(10) Patent No.: US 8,129,657 B2
(45) Date of Patent: Mar. 6, 2012

(54) MACHINING HEAD WITH INTEGRATED POWDER SUPPLY FOR DEPOSITION WELDING USING LASER RADIATION

(75) Inventors: Steffen Nowotny, Radebeul (DE); Andreas Schmidt, Hochkirch (DE); Siegfried Scharek, Freital (DE); Tobias Naumann, Dresden (DE); Friedrich Kempe, Dresden (DE)

(73) Assignee: Fraunhofer-Gesellschaft zur Foerderung der Angewandten Forschung E.V., Munich (DE)

( * ) Notice: Subject to any disclaimer, the term of this patent is extended or adjusted under 35 U.S.C. 154(b) by 858 days.

(21) Appl. No.: 12/219,149

(22) Filed: Jul. 16, 2008

(65) Prior Publication Data
US 2009/0057278 A1 Mar. 5, 2009

(30) Foreign Application Priority Data
Sep. 5, 2007 (DE) .................. 10 2007 043 146

(51) Int. Cl.
*B23K 26/34* (2006.01)
(52) U.S. Cl. ............... 219/121.63; 118/641; 118/316
(58) Field of Classification Search ........ 219/121.63–121.66, 121.84; 118/641, 118/316; 427/555, 556, 596, 597
See application file for complete search history.

(56) References Cited

U.S. PATENT DOCUMENTS

| | | | | |
|---|---|---|---|---|
| 2,644,070 A * | 6/1953 | Herbst | | 219/74 |
| 2,931,886 A * | 4/1960 | Nunnelee et al. | | 219/73.21 |
| 4,724,299 A * | 2/1988 | Hammeke | | 219/121.6 |
| 5,043,548 A | 8/1991 | Whitney et al. | | |
| 5,321,228 A * | 6/1994 | Krause et al. | | 219/121.84 |
| 5,486,676 A * | 1/1996 | Aleshin | | 219/121.63 |
| 5,714,735 A * | 2/1998 | Offer | | 219/136 |
| 5,837,960 A | 11/1998 | Lewis et al. | | |
| 5,993,554 A * | 11/1999 | Keicher et al. | | 118/641 |
| 6,046,426 A | 4/2000 | Jeantette et al. | | |
| 6,251,488 B1 * | 6/2001 | Miller et al. | | 427/596 |
| 6,316,744 B1 * | 11/2001 | Nowotny et al. | | 219/121.84 |
| 6,534,745 B1 * | 3/2003 | Lowney | | 219/121.84 |
| 7,605,346 B2 * | 10/2009 | Harris et al. | | 219/121.84 |
| 7,626,136 B2 * | 12/2009 | Sato et al. | | 219/121.63 |
| 2005/0103756 A1 * | 5/2005 | Baker et al. | | 219/121.63 |
| 2006/0003095 A1 * | 1/2006 | Bullen et al. | | 427/180 |

FOREIGN PATENT DOCUMENTS

| | | |
|---|---|---|
| DE | 3637568 | 5/1988 |
| DE | 10005592 | 10/2001 |
| DE | 19909390 | 11/2001 |
| EP | 1 535 696 | 6/2005 |
| GB | 2228428 | 8/1990 |
| JP | 04084684 | 3/1992 |
| JP | 11000775 | 1/1999 |
| WO | WO 2005/084875 | 9/2005 |
| WO | WO 2007/022567 | 3/2007 |

* cited by examiner

*Primary Examiner* — Samuel M Heinrich
(74) *Attorney, Agent, or Firm* — Jacobson Holman PLLC

(57) ABSTRACT

The invention relates to a machining head with integrated powder supply for deposition welding using laser radiation. A machining head in accordance with the invention can in particular be used for deposition welding at a high deposition rate. In the machining head in accordance with the invention, the laser radiation is directed to supplied powder and to a material surface with a focal spot. The powder supply takes place symmetrically to the axial feed direction with a plurality of channels arranged oppositely. The channels are aligned at an obliquely inclined angle so that powder discharged from them is supplied into the focal spot of the laser radiation from two mutually oppositely disposed sides over the total width of the focal spot with respect to the axial feed direction.

13 Claims, 3 Drawing Sheets

Figure 1:
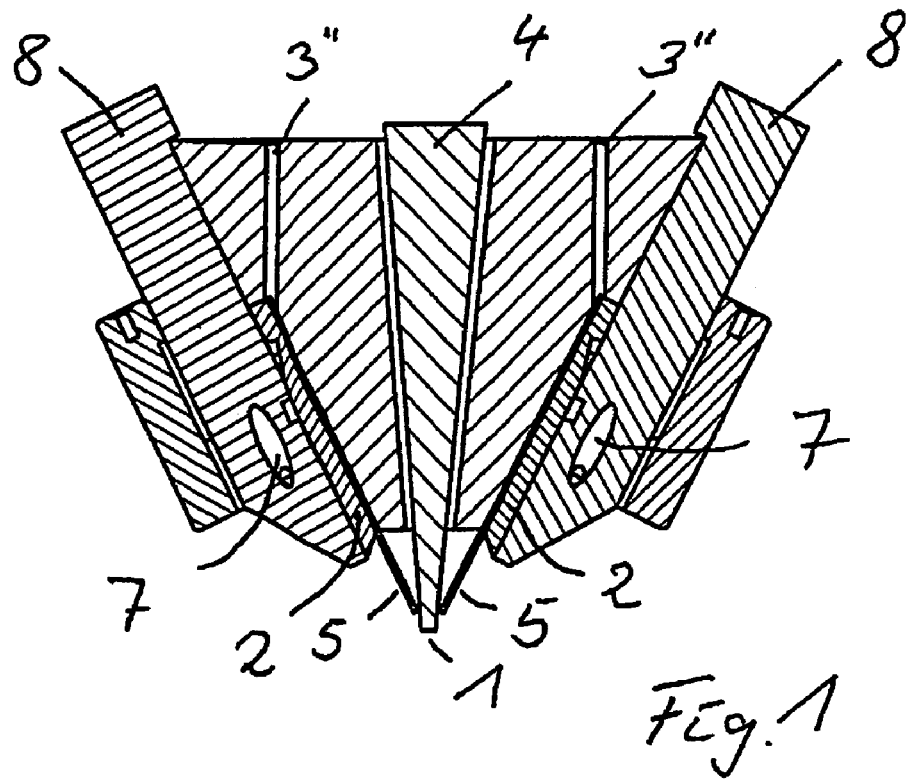

MACHINING HEAD WITH INTEGRATED POWDER SUPPLY FOR DEPOSITION WELDING USING LASER RADIATION

The invention relates to a machining head with integrated powder supply for deposition welding using laser radiation. A machining head in accordance with the invention can in particular be used for deposition welding at a high deposition rate.

Two different technical solutions have previously generally been used for powder supply in deposition welding. In one of these variants, powder is supplied radially peripherally around a laser beam directed to a workpiece surface for deposition welding, as is described in DE 19909390 C1, for example. In this respect, however, only a limited track width can be realized and the achievable deposition rate is naturally thereby also limited. Problems moreover result in the border regions between deposition tracks which are formed next to one another and in which no practically homogeneous layer thickness of the deposited material can be achieved.

In the second previously used variant, so-called "lateral powder jets" are used. The powder supply takes place from the side in this respect. No exactly shaped powder flow cross-section can thereby be achieved on the workpiece surface. The supplied powder flow cannot be precisely limited in this connection and can also not be set variably in order, for example, to be able to be adapted to a respective demand. The powder jet shape of the supplied powder is distorted by the laterally oblique powder supply. The already mentioned problems in the border regions between tracks formed next to one another also occur in deposition welding here.

It is therefore the object of the invention to achieve an increased deposition rate in deposition welding and also to achieve an improved homogeneity of the deposited material on a workpiece surface.

In accordance with the invention, this object is solved by a machining head having the features of claim 1.

Advantageous aspects and further developments of the invention can be achieved using features designated in the subordinate claims.

The machining head in accordance with the invention with integrated powder supply is made such that the powder supply takes place symmetrically to the axial feed direction of two mutually oppositely disposed sides. For this purpose, accordingly, a plurality of channels are present which are arranged opposite one another and which form the powder supply. The channels are aligned at an obliquely inclined angle. Powder exiting the channels is thereby incident at a focal spot of the laser radiation from two mutually oppositely disposed sides over the total width of the focal spot with respect to the axial feed direction.

The channels should be inclined at an angle at which exiting powder is incident to the longitudinal axis of the focal spot aligned perpendicular to the axial feed direction.

It is possible with the invention to allow the powder to exit such that it is incident onto an axis on the workpiece surface and such that a straight-line powder front can be formed on the feed.

With a machining head in accordance with the invention, a laser beam used should be shaped such that a focal spot is obtained which has a square or elliptical shape. However, a rectangular design of a focal spot is particularly preferred. Instead of a beam shape as described above, however, a corresponding deflection can be used, e.g. with scanners and/or focal spot shaping of a laser beam with a spot-like focal spot, wherein an embodiment will probably be preferred, however, with a corresponding beam shape as explained above.

Much larger track widths, and accordingly also deposition rates, than is the case in the prior art can be achieved in combination of the powder supply in accordance with the invention and a preferred beam shape or beam deflection. A track width greater than 20 mm can thus easily be achieved, for example.

A focal spot should accordingly, where possible, have a greater length than width with respect to the axial feed direction so that the length corresponds at least approximately to the track width.

The angle of inclination of the channels present at a machining head in accordance with the invention can also be selected while taking account of the spacing between the powder discharge openings and/or of the spacing between the powder discharge openings and the workpiece surface. In this respect, the powder flows exiting the channels should be incident onto a common axis and a quasi-focusing of the powder flow should thereby be achieved.

It is preferred in this respect to form channels in or at least one insert. An insert can then be flanged from the lower side to a machining head in accordance with the invention. In this case, a free space is present in the interior of such an insert and the laser beam can be directed to the workpiece surface through it. The channels in accordance with the invention are then formed at sides of such an insert arranged opposite one another.

However, there is also the possibility of providing two inserts at a machining head which are then arranged before and after the focal spot in the axial feed direction. However, a plurality of inserts with channels can also be used at a machining head in a series arrangement before and after the focal spot for an adaptation to larger track widths which may be necessary.

Such inserts can then be inserted into corresponding mounts formed at the machining head and can be connected to a powder supply optionally with a carrier gas. Inserts can then be swapped for an adaptation to different applications. In this respect, an adaptation can take place while taking account of a desired track width to be formed and/or an adaptation to the powder quantity to be applied to the workpiece surface can take place. The layer thickness of a layer to be formed on a workpiece surface can, for example, also be influenced with the latter. This can be achieved solely, but also additionally, by a variation of the spacing of the powder discharge openings of the channels from the workpiece surface, the angle of inclination of the channels, the powder mass flow supplied into the channels and/or also by a corresponding adaptation of the inner diameters of channels and the spacings between the powder discharge openings of channels.

In this respect, the spacing and diameter or free cross-sections of powder discharge openings can be selected such that a homogeneous layer thickness of the powder to be applied to the workpiece surface can be achieved while taking account of the divergence of the powder exiting the channels. For this purpose, the spacing between adjacent channels should be selected to be less than the diameter or a surface diagonal through a powder discharge opening.

The supply of powder can thus take place from a powder store vessel to the channels. In this respect, a plurality of powder supply channels can be present which are connected to the powder store vessel and a respective powder supply channel opens into at least two channels from which then the powder can be directed to the focal spot. The powder flow is thus divided into equal part flows guided into the channels.

A carrier gas can also additionally be guided through the channels for the powder transport, with at least a part fluidization of the powder being able to be achieved with said carrier gas such that a uniform powder mass flow can be directed onto the workpiece surface.

As already addressed, it is advantageous to be able to change the angle of inclination of channels. This can be achieved, on the one hand, by an already addressed swapping of corresponding inserts with channels inclined at different angles. On the other hand, there is also the possibility, however, of being able to change the angle of inclination by a corresponding device at a machining head. In this connection, the angle of inclination of inserts fastened to a machining head can, for example, be changed using suitable setting means. For this purpose, regulating screws can be used, for example, or a setting by means of an eccentric screw.

It can be advantageous for a uniform or a directly varied powder quantity distribution to arrange channels and/or powder discharge openings of channels offset to one another at the oppositely disposed sides of the machining head so that a respective powder discharge opening is arranged at a side between two powder discharge openings which are arranged at the other side. A mixing of two different starting powders and thus the forming of a corresponding alloy can also be achieved in deposition welding with such a comb-shaped formation.

A supply for protective gas can additionally be provided in a machining head in accordance with the invention. In this respect, the protective gas can flow through the interior, that is, the free region, through which the laser beam is directed onto the workpiece surface. However, there is also the possibility of providing a supply of protective gas in the region of the channels, preferably by means of additional channels for protective gas. Such channels for protective gas can then preferably be arranged at the outer edges, that is, next to the respective outwardly arranged channels for powder. The protective gas flow can also be made in this respect such that it has an advantageous influence on the shape of the discharged powder flow on the workpiece surface.

A locally differentiated energy density in the focal spot can frequently not be avoided or set directly in particular with a laser beam which is expanded by beam shaping and which has a geometrical shape differing from a circular shape. Lower energy densities thus occur in the marginal region of a focal spot obtained in this manner so that lower temperatures for the melting of the powder can also be recorded there. This circumstance can be countered in that the free cross-sections of channels and/or powder discharge openings of the channels are dimensioned such that in regions in which lower energy densities can be recorded in the focal spot a correspondingly reduced powder mass flow is applied to the workpiece surface than is the case in other regions in which the energy density of the focal spot is greater. It is thereby also possible to influence the track shape directly.

A machining head in accordance with the invention can, however, also have a cooling which is also effective in regions in which inserts with channels are arranged. This can be achieved, for example, by a water cooling integrated in the machining head.

It is possible with the machining head in accordance with the invention to form a powder jet shape on the workpiece surface which is adapted to the performance density profile of the laser beam.

The powder flow applied to the workpiece surface can be adapted ideally to the focal spot shape and the laser beam axis while taking account of the feed in deposition welding. Disadvantageous distortion effects such as is the case with a lateral powder supply in accordance with the prior art, can thereby also be avoided.

A sharp delineation of the powder flow guided on the workpiece surface toward the outside is possible so that the powder jet can be shaped precisely and adapted to the focal spot geometry, with a high powder exploitation in deposition welding also being achievable.

With a homogeneous powder density distribution over the whole cross-section of a track, a practically uniform layer thickness of a layer formed on a workpiece surface can also be achieved over the total cross-section of a track. Furthermore, an adaptation to the laser power density over the respective surface or track width is possible. In addition, as already indicated, the powder mass flow density can also be set in a differentiated manner, which was not possible with the technical solutions known from the prior art.

With a protective gas flow formed at a machining head, a protective gas screening of the melting bath and also an advantageous influencing of the shape and stabilization of the powder flow can additionally be achieved.

A machining head in accordance with the invention can be made in compact form so that good accessibility is also possible to welding positions which are difficult to reach and with contoured workpiece surfaces.

A powder mass flow of more than 5 kg/hour can be achieved with deposition welding with the invention. At a higher laser performance, much higher values can also be achieved. The possibility thereby also results of being able to form large-area coatings with a very high deposition rate with a reduced processing time. Undercuts can be avoided and a very slight fusion of the base material of the workpiece with good surface quality of coatings formed can be achieved.

Track widths can thus be achieve in deposition welding, for example, of up to 22 mm with a 6 kW diode laser and a corresponding beam shape with a rectangular focal spot. Focal spot geometries can easily be set with an extent of 8×2 mm to 22×5 mm in this context.

With a rectangular focal spot, an improvement in the planarity of the surface and a small track overlap can be achieved, which likewise results in the increase of the surface coating rate. The powder applied to the workpiece surface can, as has been demonstrated, be utilized up to 95%, which is well above the previously achievable rates.

The invention will be explained in more detail by way of example in the following.

Figure 2:
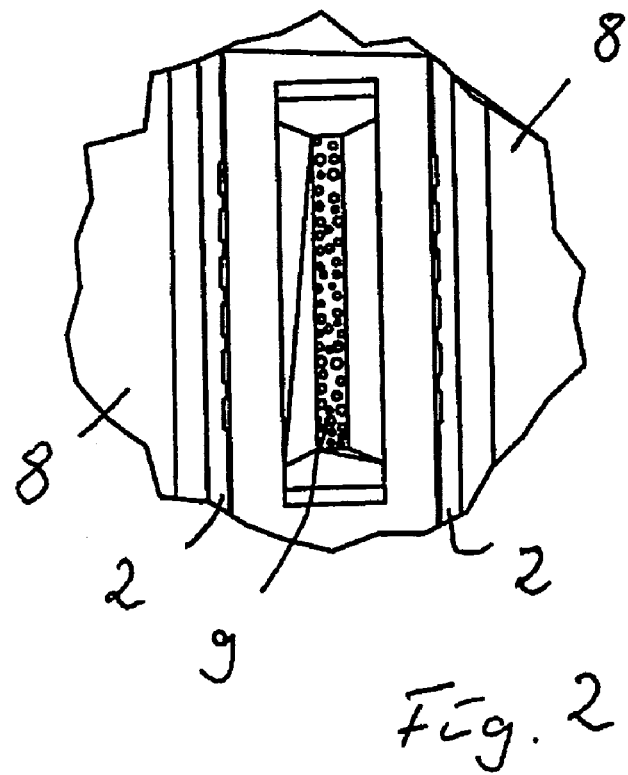
Figure 3:
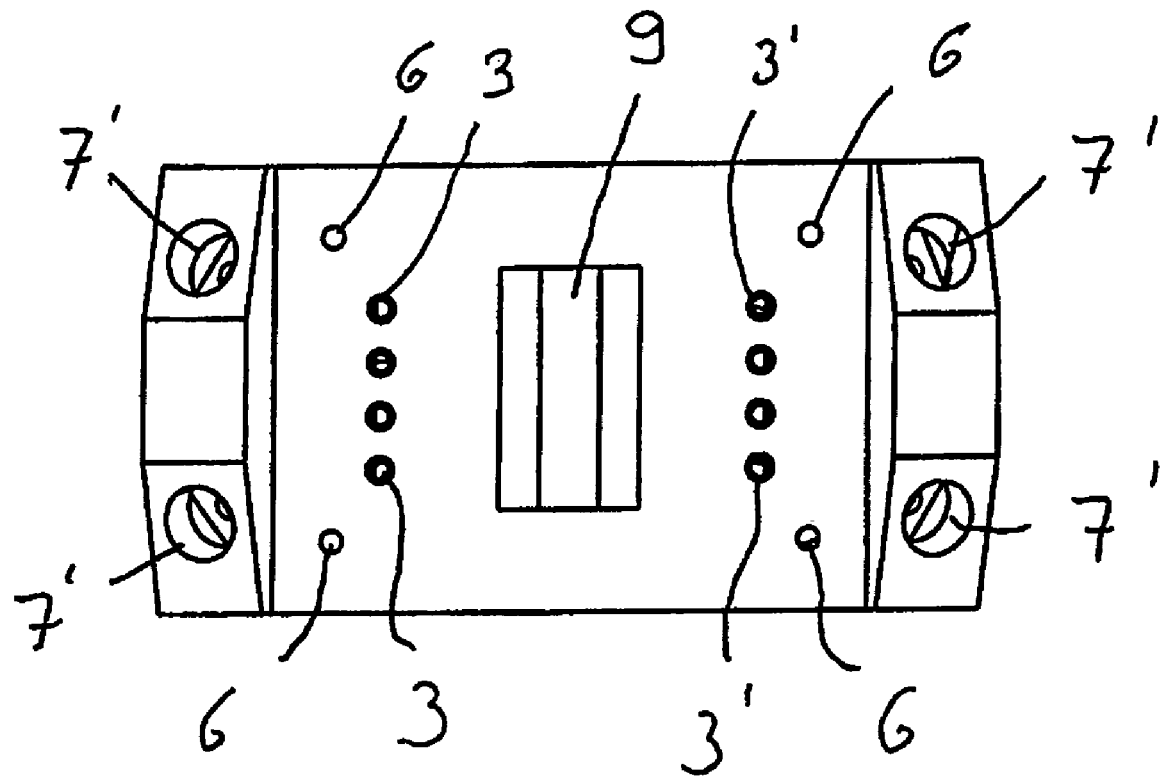

There are shown:

FIG. 1 a sectional representation through a part region of a machining head in accordance with the invention;

FIG. 2 a part view considered from above of a machining head in accordance with FIG. 1;

FIG. 3 a view of a part of a machining head from above; and

Figure 4:
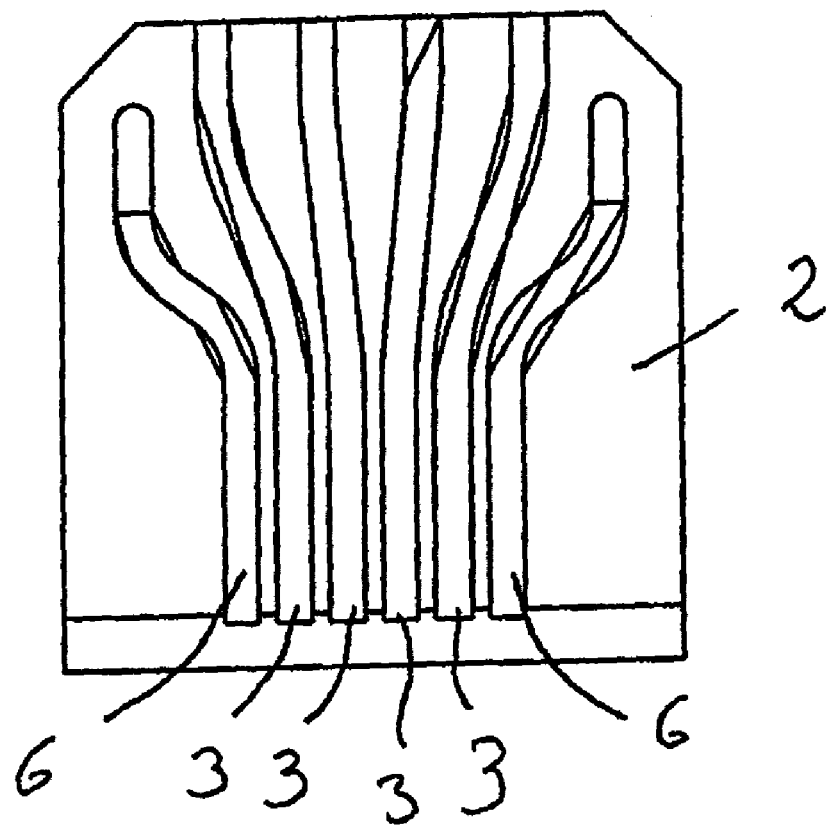
Figure 4:
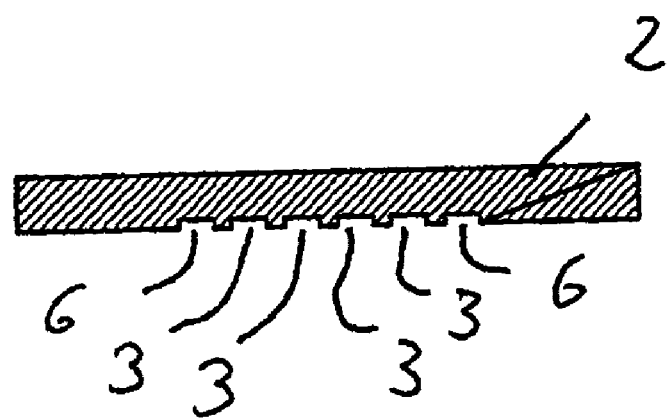

FIG. 4 a plurality of views of an insert with channels which can be inserted at a machining head.

It becomes clear from the sectional representation in FIG. 1 how laser radiation 4 with a rectangular focal spot 1 can be directed to the surface of a workpiece through an opening 9 within a machining head. Two inserts 2 with holders 8 arranged opposite one another are fastened to the machining head. This can be achieved with a screw connection.

The inserts 2 are aligned at an obliquely inclined angle and are accordingly arranged in wedge shape. Channels 3, 3' for the powder 5 used for deposition welding are formed at the inserts 2. The powder 5 can be supplied to the channels 3 via powder supply channels 3" and can be applied to the workpiece surface over the surface in the shape adapted to the focal spot 1. The powder 5 exiting the powder discharge openings is in this connection incident from both sides of the focal spot 1 as a result of the angle of inclination of the inserts 2 and from the channels 3, 3' in a converging manner and is quasi focused with respect to the focal spot 1 in this respect.

A cooling 7 is also present at the machining head and water can be supplied and drained through it via channels 7' (see FIG. 3).

It becomes clear from FIG. 2 how the powder supplied via the channels 3, 3' is applied in a distributed manner with a uniform shape onto the workpiece surface in the region in which the focal spot 1 can be effective.

The arrangement of a respective four channels 3, 3' for powder in two mutually disposed rows can be recognized in the view from above shown in FIG. 3. The powder discharge openings, not recognizable here, are likewise arranged in two rows, but with a smaller spacing from one another due to the angles of inclination of the channels 3.

Four channels 6 for the supply of protective gas are present at outer margins in four corners and protective gas can be supplied via them around the powder 5 applied to the workpiece surface and around the focal spot 1 in the form of a gas flow to reduce the powder scatter. In addition, the formation of a protective gas veil is possible via the opening from above.

In addition, channels 7' for cooling water are present.

FIG. 4 shows two views of an insert 2 at which channels 3 are formed at a surface. The channels 3 are here arranged equidistant from one another regionally so that the powder discharge openings of the channels 3 also have the same intervals from one another. In the upper representation of FIG. 4, junctions are present for powder supply channels 3" which open into channels 3. The two channels 6 respectively outwardly arranged are provided for protective gas.

The channels 3 and 6 in this example also have a rectangular cross-sectional shape in addition to the same free cross-sectional surfaces. However, different cross-sectional shapes, for example round or rounded cross-sectional shapes, can also be selected.

The invention claimed is:

1. A machining head comprising
   integrated powder supply for deposition welding with laser radiation which is directed with a focal spot onto supplied powder and onto a workpiece surface,
   the powder supply being formed symmetrically to the axial feed direction with a plurality of channels arranged oppositely and the channels being aligned at an obliquely inclined angle so that powder exiting them is supplied into the focal spot of the laser radiation from two mutually oppositely disposed sides over a whole width of the focal spot with respect to the axial feed direction,
   the channels being arranged and aligned such that powder is incident from two mutually oppositely disposed sides onto an axis onto the workpiece surface while forming a straight-line powder front,
   the focal spot having a rectangular, square or elliptical shape,
   the channels being arranged parallel to one another in a series arrangement,
   the focal spot having a larger length than width with respect to the axial feed direction.

2. The machining head in accordance with claim 1, wherein the channels are inclined at an angle at which exiting powder is incident onto the longitudinal axis of the focal spot aligned perpendicular to the axial feed direction.

3. The machining head in accordance with claim 1, wherein the laser radiation is directed onto the supplied powder and onto the workpiece surface such that the focal spot has a geometrical design differing from a circular shape.

4. The machining head in accordance with claim 1, wherein the channels are formed in/at least one insert.

5. The machining head in accordance with claim 1, wherein at least one insert is swappably fastened to the machining head.

6. The machining head in accordance with claim 1, wherein a respective powder supply channel opens into at least two channels from which the respective powder is directed onto the focal spot.

7. The machining head in accordance with claim 1, wherein the angle of inclination of the channels is changeable.

8. The machining head in accordance with claim 1, wherein the channels are additionally connected to a carrier gas supply.

9. The machining head in accordance with claim 1, wherein the channels and/or the powder discharge openings of the channels are arranged equidistant from one another.

10. The machining head in accordance with claim 1, wherein channels arranged opposite one another with respect to the axial feed direction and/or their powder discharge openings are arranged offset to one another.

11. The machining head in accordance with claim 1, wherein the free cross-sections of channels and/or powder discharge openings of channels are dimensioned such that the powder mass flow exiting the channels is adapted to the local energy density in the focal spot.

12. The machining head in accordance with claim 1, wherein additional channels for the supply of protective gas are formed at/in the insert(s).

13. The machining head in accordance with claim 1, wherein a cooling is arranged in the region of inserts.

* * * * *